United States Patent [19]

Ryu

[11] Patent Number: 5,272,541
[45] Date of Patent: Dec. 21, 1993

[54] CIRCUIT FOR CONTROLLING PICTURE QUALITY IN A VIDEO REPRODUCING APPARATUS

[75] Inventor: Jeong-hyeong Ryu, Suwon, Rep. of Korea

[73] Assignee: Samsung Electronics Co., Ltd., Rep. of Korea

[21] Appl. No.: 850,937

[22] Filed: Mar. 13, 1992

[30] Foreign Application Priority Data

Nov. 29, 1991 [KR] Rep. of Korea ............... 91-21806

[51] Int. Cl.$^5$ .................. H04N 9/79; H04N 5/94
[52] U.S. Cl. .................. 358/310; 358/327; 358/329; 358/336
[58] Field of Search ............... 358/310, 335, 336, 337, 358/340, 315, 320, 327, 328, 329, 36, 37, 166, 167, 31, 162; 360/36.1, 36.2

[56] References Cited

U.S. PATENT DOCUMENTS

| | | | |
|---|---|---|---|
| 3,961,359 | 6/1976 | Okuno et al. | 358/329 |
| 4,766,487 | 8/1988 | Tanaka et al. | 358/36 |
| 4,922,331 | 5/1990 | Ezaki | 358/315 |

Primary Examiner—Tommy Chin
Assistant Examiner—Thai Tran
Attorney, Agent, or Firm—Sughrue, Mion, Zinn Macpeak & Seas

[57] ABSTRACT

A circuit for controlling picture quality of a video reproducing apparatus, wherein the circuit optimally compensates the frequency characteristic at different magnitudes according to the degree of minuteness of the reproduced video signal. The circuit for controlling picture quality in a video reproducing apparatus is composed of a picture controller for varying the frequency characteristic of the reproduced video signal, a comb filter for detecting the quantity of correlations between scanning lines of the reproduced video signal, a high band component detector for detecting the high band component signal from the reproduced video signal, and a mixing circuit for combining the outputs of the comb filter and the high band component detector and supplying the result to a picture quality controller, thereby controlling variation in the frequency characteristics of the reproduced video signal.

5 Claims, 1 Drawing Sheet

CIRCUIT FOR CONTROLLING PICTURE QUALITY IN A VIDEO REPRODUCING APPARATUS

BACKGROUND OF THE INVENTION

The present invention relates to a circuit for processing video signals reproduced in a video reproducing apparatus, and more particularly to a circuit for controlling picture quality so that image elements have optimal sharpness according to the content of a picture.

An ordinary video reproducing apparatus is used for reproducing video signals which have been recorded on a recording medium. Video tape recorders and optical disk players can be classified as video reproducing apparatuses. Such a video reproducing apparatus reads the video information composed of high frequency signals from the recording medium and demodulates the read high frequency signals to reproduce the original video signal. To improve the resolution of the picture, the video reproducing apparatus compensates the sharpness component of the demodulated video signal and provides a display unit with the sharpness-compensated video signal.

However, there is a problem in the conventional video reproducing apparatus in that the sharpness component of the video signal has been uniformly compensated without considering the content of the picture, i.e., the frequency of the video signal, thereby resulting in degradation of the displayed picture quality.

SUMMARY OF THE INVENTION

Therefore, an object of the present invention is to provide a circuit for controlling picture quality so that the sharpness components of the video signals are properly compensated in accordance with the content of the picture in a video reproducing apparatus.

In addition, another object of the present invention is to provide a circuit for controlling picture quality to properly control and compensate the sharpness components of video signals in response to the reproducing speed thereof in a video reproducing apparatus.

To achieve the above objects of the present invention, the frequency characteristic of reproduced video signals is converted according to the summation signal of the quantity of the correlation between scanning lines and the quantity of high band components of the reproduced video signal.

Also, the present invention regulates the quantity of the correlation between scanning lines of a video signal, and the ratio of the quantity of correlation between scanning lines of the summation signal of the high band component quantity and the quantity of high band components according to the reproducing speed of the recording medium.

According to one aspect of the present invention, there is provided a circuit for controlling picture quality in a video reproducing apparatus for reproducing a video signal recorded on a recording medium, the circuit comprising:

a first input line for receiving the video signal demodulated from a video demodulator;

a second input line for receiving a reproducing speed control signal from a system controller;

a picture controller for varying and outputting a frequency characteristic of the demodulated video signal;

comb filter means for detecting a quantity of correlation between scanning lines of the demodulated video signal;

high band component detecting means for detecting the quantity of the high band component of the demodulated video signal; and a mixer for combining the outputs of the comb filter means and the high band component detecting means in a specific ratio, and supplying the result to the picture controller to thereby control variation in the frequency characteristics.

BRIEF DESCRIPTION OF THE DRAWINGS

The above object and other advantages of the present invention will become more apparent by describing in detail the preferred embodiment of the present invention with reference to the attached drawing, in which.

DETAILED DESCRIPTION OF A PREFERRED EMBODIMENT

Figure 1:
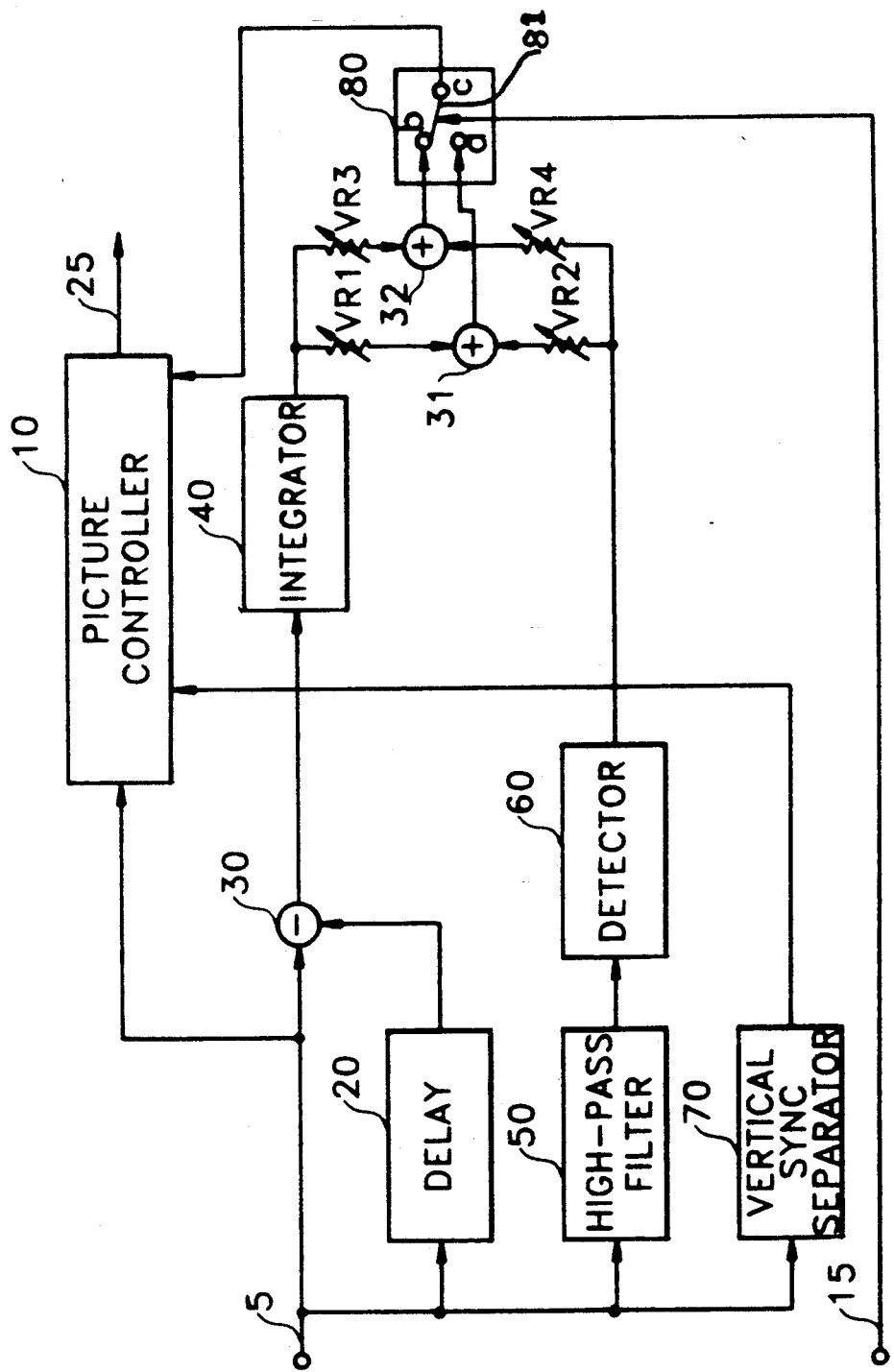
FIG. 1 shows a circuit for controlling picture quality of a video reproducing apparatus according to the present invention.

Hereinafter, the detailed description of the present invention with reference to the accompanying drawing is as follows.

Referring to FIG. 1, a first input line 5 is connected to the input of a picture controller 10, a first input terminal of a subtracter 30, the input of a delay 20, the input of a high-pass filter 50, and the input of a vertical synchronizing signal separator 70. Additionally, first input line 5 is connected to a video demodulator (not illustrated) for receiving the reproduced video signal. A second input line 15 is connected to a mode setting section (not illustrated) or a system controller (not illustrated) for receiving the reproducing speed control signal indicating the reproducing speed of the recording medium. Also, second input line 15 is connected to switching blade 81 of a control switch 80. The output of delay 20 is connected to a second input of subtracter 30 whose output is connected to the input of an integrator 40. The output of integrator 40 is connected to one end of each of first and third variable resistors VR1 and VR3. The opposite ends of first and third variable resistors VR1 and VR3 are connected to the first input terminals of first and second adders 31 and 32, respectively. The output of high-pass filter 50 is connected to the input of detector 60 whose output is connected to one end of each of second and fourth variable resistors VR2 and VR4. The opposite ends of second and fourth variable resistors VR2 and VR4 are connected to the second input terminals of first and second adders 31 and 32, respectively. The outputs of first and second adders 31 and 32 are connected to select contacts a and b of control switch 80, respectively. The output of vertical synchronizing signal separator 70 is connected to a first control terminal of picture controller 10. Switching blade 81 of control switch 80 is connected to a second control terminal of picture controller 10. The output of picture controller 10 is connected to a display unit (not illustrated) through output line 25.

In the operation of the picture quality control circuit shown in FIG. 1, delay 20 supplies the video signal received from first input line 5 to the second input terminal of subtracter 30 by delaying the video signal for one horizontal synchronizing signal period. Subtracter 30 subtracts the video signal having been delayed by one horizontal synchronous signal period from the video signal from first input line 5 to generate a signal representing difference between scanning lines. Integrator 40 integrates the difference signal from subtracter 30 and provides the integrated difference signal to first input terminals of first and second adders 31 and 32 via first and third variable resistors VR1 and VR3, respectively. The delay 20, subtraction 30, and integration 40 together form a comb filter means for detecting a quantity of correlation between scanning lines of the demodulated video signal.

Meanwhile, also receiving video signals from first input line 5, high-pass filter 50 passes those video signals having frequencies higher than a predetermined cut-off frequency (for example, 2.5 MHz) to detector 60. Detector 60 generates a DC voltage corresponding to the quantity or amount of the video signal above the predetermined frequency, which has been detected by high pass filter 50, and supplies it to the second input terminals of first and second adders 31 and 32 via second and fourth variable resistors VR2 and VR4, respectively.

First to fourth variable resistors VR1 to VR4 attenuate the output of integrator 40 and that of detector 60 which are respectively supplied to the input terminals of first and second adders 31 and 32, with an attenuation rate predetermined by the user or manufacturer. As a result, first and second variable resistors VR1 and VR2 regulate the mixing ratio of the outputs from integrator 40 and detector 60 which are combined in first adder 31, and third and fourth resistors VR3 and VR4 regulate the mixing ratio of the outputs from integrator 40 and detector 60 which are combined in second adder 32. According to the logic state of the reproducing speed control signal applied through second input line 15, control switch 80 chooses either the output of first adder 31 or that of second adder 32, and supplies the selected output to the second control terminal of picture controller 10.

Vertical synchronizing signal separator 70 separates the vertical synchronizing signal from the video signal received through first input line 5 and supplies it to the first control terminal of picture controller 10.

Picture controller 10 compensates sharpness components whose frequencies are higher than the predetermined frequency or lower than the frequency out of video signals received from first input line 5 at different rates according to the level of the output signal of control switch 80, which is applied to its second control terminal, and outputs the sharpness-compensated video signal to the display unit through output line 25. Picture controller 10 varies sharpness compensation rates for each frequency component of the video signal for every period of the vertical synchronizing signal, in response to the vertical synchronizing signal applied to its first control terminal.

As mentioned above, the present invention has the advantages wherein optimal sharpness components of the video signal can be obtained by compensating the sharpness component of the reproduced video signal in accordance with the degree of minuteness of a picture at different magnitudes for each frequency, thus preventing the degradation of picture quality.

What is claimed is:

1. A circuit for controlling picture quality in a video reproducing apparatus for reproducing a video signal recorded on a recording medium, said circuit comprising:

a first input line for receiving a video signal having been first reproduced from said recording medium and then demodulated by a video demodulator;

a second input line for receiving a reproducing speed control signal indicating a reproducing speed of said recording medium from a system controller;

picture control means for varying a frequency characteristic of said demodulated video signal and outputting a result;

comb filter means for detecting a degree of correlation between two successive scanning lines of said demodulated video signal;

high band component detecting means for detecting a level of a high band component of said demodulated video signal; and mixing means for receiving said reproducing speed control signal and for combining the outputs of said comb filter means and said high band component detecting means at a specific ratio selected by said speed control signal and supplying a result to said picture control means to thereby control variation in frequency characteristics.

2. A circuit for controlling a picture quality as claimed in claim 1, wherein said comb filter means comprises:

a delay circuit for delaying said demodulated video signal for one horizontal synchronizing signal period;

a subtracter for receiving said demodulated video signal and said delayed video signal and subtracting said delayed video signal from said demodulated video signal to generate a signal representing a difference between scanning lines; and an integrator for integrating said scanning line difference signal and providing one terminal of said mixing means with said integrated scanning line difference signal 3. A circuit for controlling picture quality as claimed in claim 2, wherein said high band component detecting means comprises:

a high-pass filter for receiving said demodulated video signal and passing those video signals whose frequencies are higher than a predetermined cut-off frequency; and a detector for receiving an output from said high-pass filter, generating a DC voltage corresponding to the quantity of said passed video signals and supplying it to another terminal of said mixing means.

4. A circuit for controlling picture quality as claimed in claim 3, wherein said mixing means comprises:

first and third variable resistors for receiving said integrated scanning line difference signal at respective terminals and attenuating them by a predetermined attenuation late;

second and fourth variable resistors for receiving said DC voltage at respective terminals and attenuating them by a predetermined attenuation rate;

a first adder for adding said integrated scanning line difference signal and said DC voltage which are input after being attenuated by the predetermined attenuation rates via said first and second variable resistors;

a second adder for adding said integrated scanning line difference signal and said DC voltage which are input after being attenuated by the predetermined attenuation rates via said third and fourth variable resistors; and a control switch for receiving outputs from said first and second adders, selecting one of the outputs of said first and second adders according to the logic state of said reproducing speed control signal input via said second input line, and supplying said selected output to said picture control means, 5. A circuit for controlling picture quality as claimed in claim 4, wherein said picture control means comprises:

a vertical synchronizing signal separator for receiving said demodulated video signal to separate a vertical synchronizing signal therefrom; and a picture controller for compensating the sharpness components of the video signal at different rates, of which frequency are higher or lower than a predetermined frequency, among video signals input through said first input line according to an output level from said control switch, and varying the sharpness compensation rates for each period of said vertical synchronizing signal in response to the vertical synchronizing signal provided by said vertical synchronizing signal separator to supply the varied signal to a display unit via an output line.

* * * * *